United States Patent Office 3,343,673
Patented Sept. 26, 1967

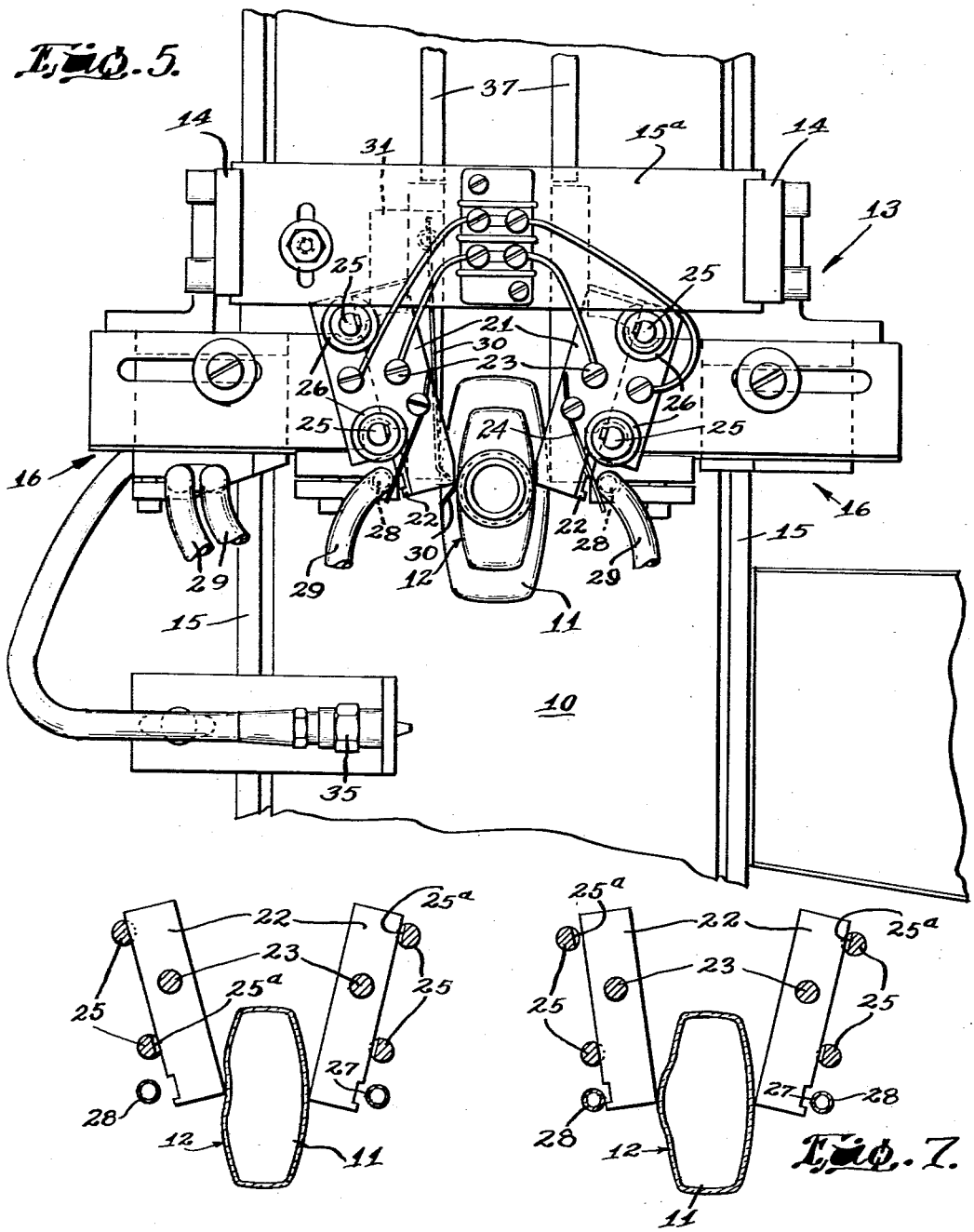

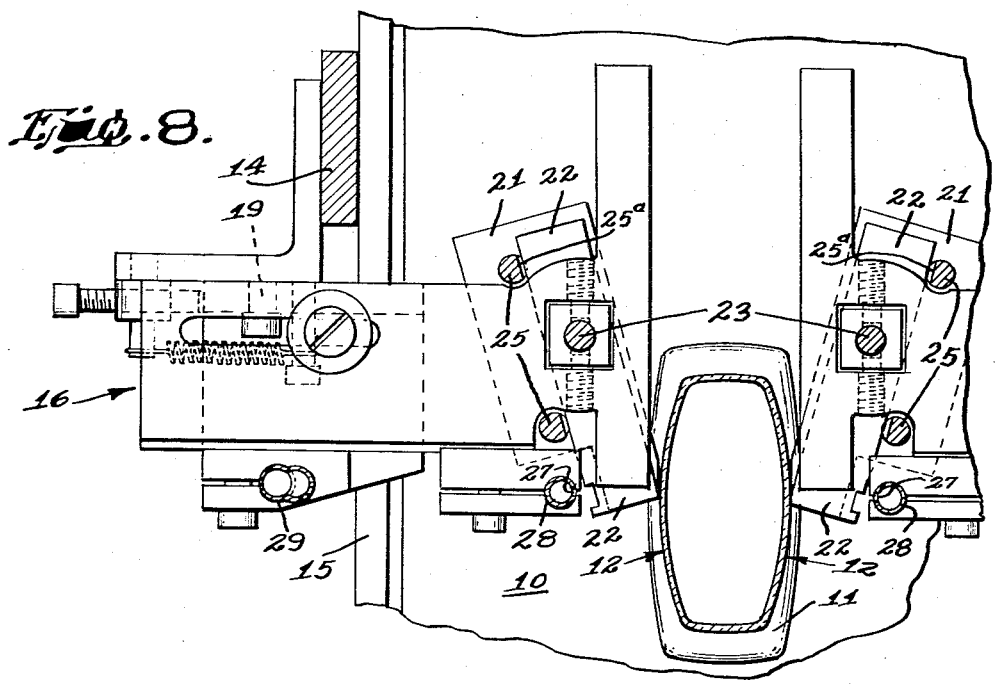
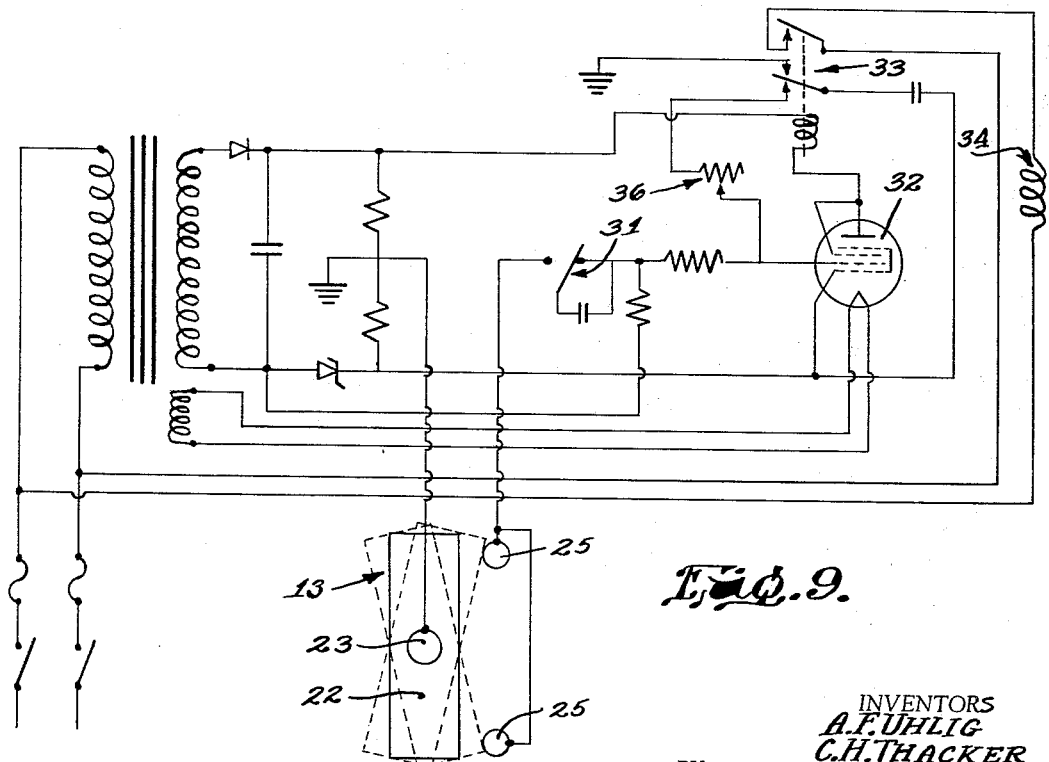

3,343,673
FLASK GAUGES
Clarence H. Thacker and Albert F. Uhlig, Oakland, Calif., assignors to Owens-Illinois, Inc., a corporation of Ohio
Filed Aug. 23, 1965, Ser. No. 481,673
13 Claims. (Cl. 209—80)

Our invention relates to gauges and more particularly is concerned with gauges for detecting certain intolerable abnormalities in the label accommodating surface or panel of flasks and the like relatively flat-sided glass containers.

An important object of our invention is the provision of a novel gauge capable of being mounted over a horizontal, continuously advancing container conveyor and capable of detecting commercially unacceptable flasks and automatically removing them from the conveyor without interrupting the normal operation.

A further object of our invention is the provision of a gauge in which jets of air under pressure actuate feeler or gauge fingers in such fashion that these fingers, or any one of them, when brought into contact with either an excessively bulged or sunken label panel surface, will cause removal of the unacceptable flask from the conveyor immediately upon its exit from the gauge influence.

It is also an object of our invention to provide a gauge of the above character in which sets of reference fingers and a plurality of the feeler or gauge fingers are so relatively positioned and actuated that the reference fingers permit free flow or advance of containers through the gauge while insuring proper positioning of the containers with respect to the feeler, or gauge fingers.

Further, it is an object of our invention to provide means whereby a reject air jet tube is under the control of the feeler or gauge fingers and a time delay relay to the extent that if any one of these fingers detects a serious defect (excessive bulge or sunken area) in a flask, such will initiate flow of air under pressure from the tube adequate to blow the defective article off of the conveyor.

Likewise, it is an object of our invention to provide a gauge of the above character in which a gauge control micro-switch is actuated by and with each entry of a flask into the gauge station, thus readying the electric circuitry for functioning in response to contact between one or more of the feeler fingers and a defective flask surface.

It is also an object of our invention to provide a gauge capable of inspecting either or both of the opposed relatively flat sides of flasks as they advance upright along a horizontal conveyor and causing ejection of defective flasks from the conveyor.

Finally, it is an important object of our invention to provide simple means whereby the gauge is capable of accommodating flasks varying both in height, width and specific location of the label space or panel.

Other objects will be in part apparent and in part pointed out hereinafter.

In the accompanying drawings forming a part of our application:

FIG. 5 is a top plan view of the gauge.

FIG. 6 is a top plan view showing a feeler finger detecting a sunken panel.

FIG. 7 is a view like FIG. 6, but with the feeler finger detecting a bulged panel.

FIG. 8 is a fragmentary sectional plan view taken along the plane of line 8—8 of FIG. 2.

FIG. 9 is a wiring diagram.

In the illustrated embodiment of our invention it is shown mounted over a continuously moving horizontal conveyor 10 which advances upright flasks 11 or similar containers, or other articles to and beyond a gauging station G or zone. These flasks 11 are of the usual type having on one side, or possibly on each of opposed sides, a well defined label accommodating space 12, or panel which, must not deviate excessively from a predetermined plane, if satisfactory labeling is to be obtained. Any excessive bulge or sunken condition not only may make labeling impossible, but will also appreciably change the capacity of the flask. Our gauge detects such excessively bulged or sunken areas and removes the defective ware from the conveyor 10.

Figure 1:
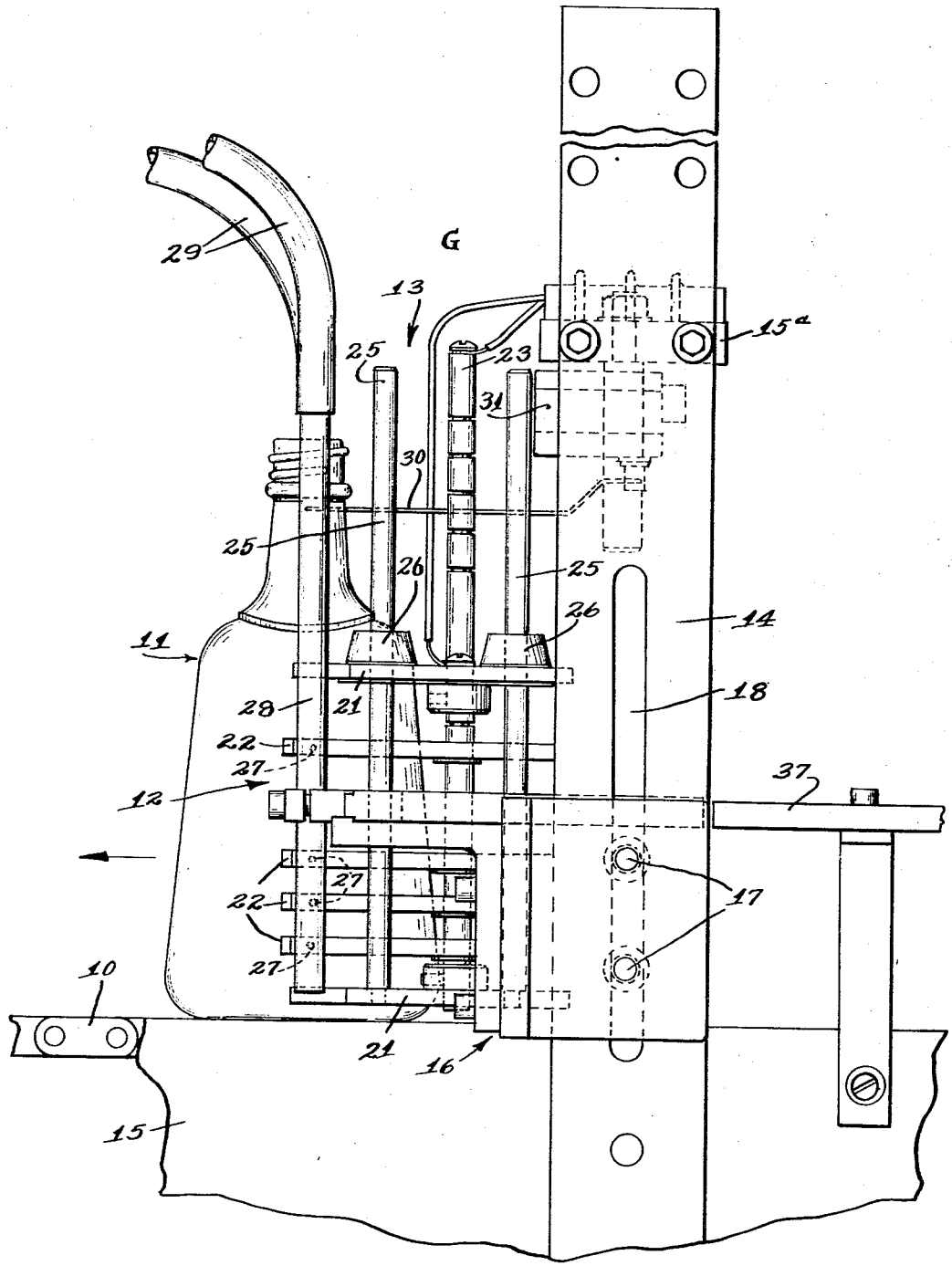
FIG. 1 is a side elevational view of the gauge mounted upon a bottle conveyor.
Figure 2:
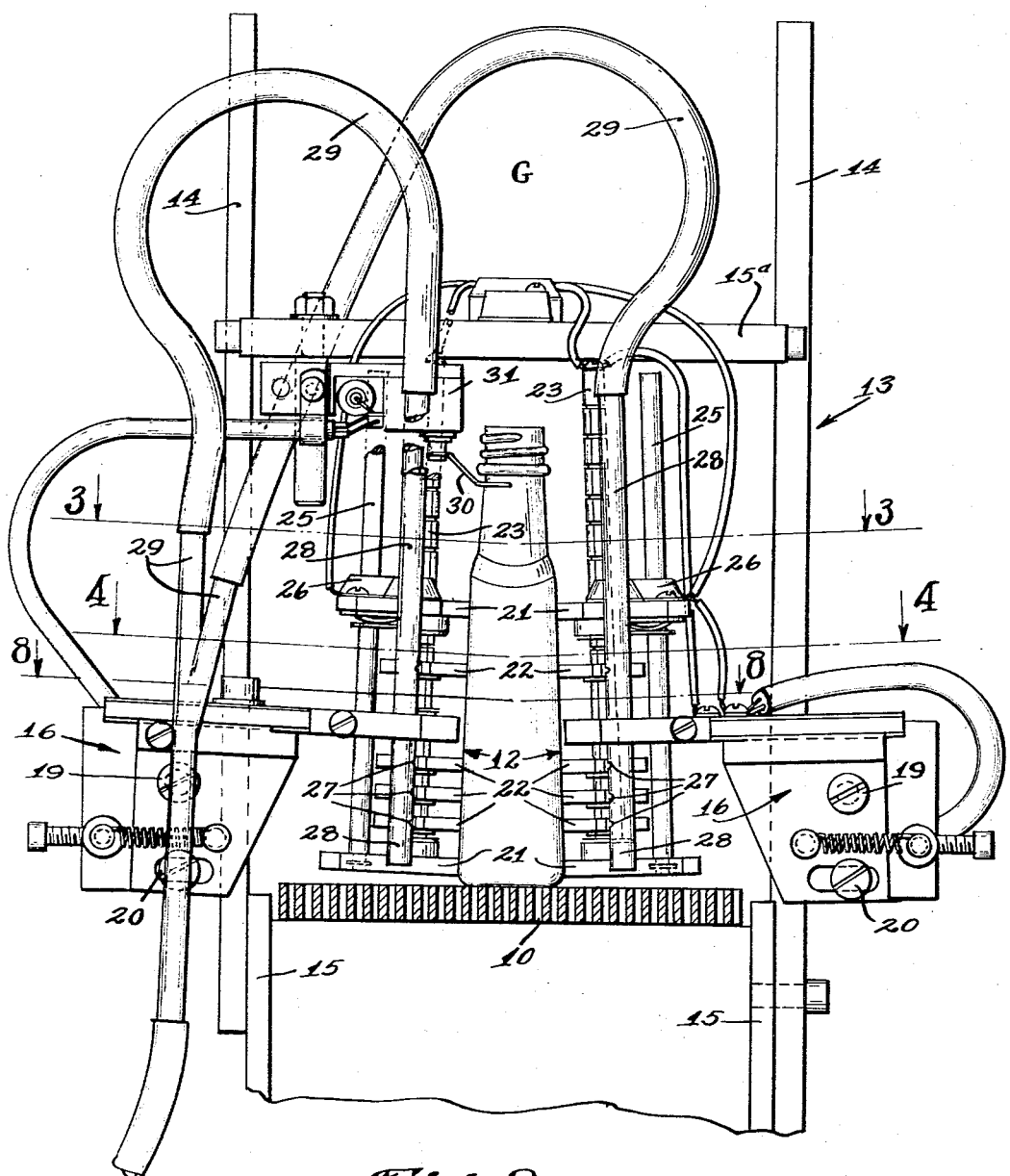
FIG. 2 is an end elevational view of the gauge looking toward the exit point.
Figure 3:
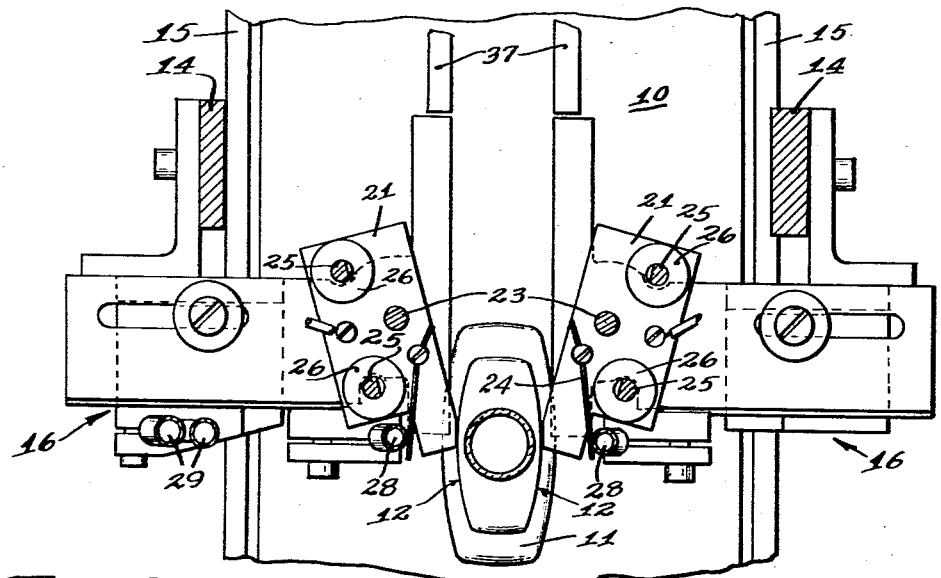
FIG. 3 is a sectional elevational view taken substantially along the plane of line 3—3 of FIG. 2.
Figure 4:
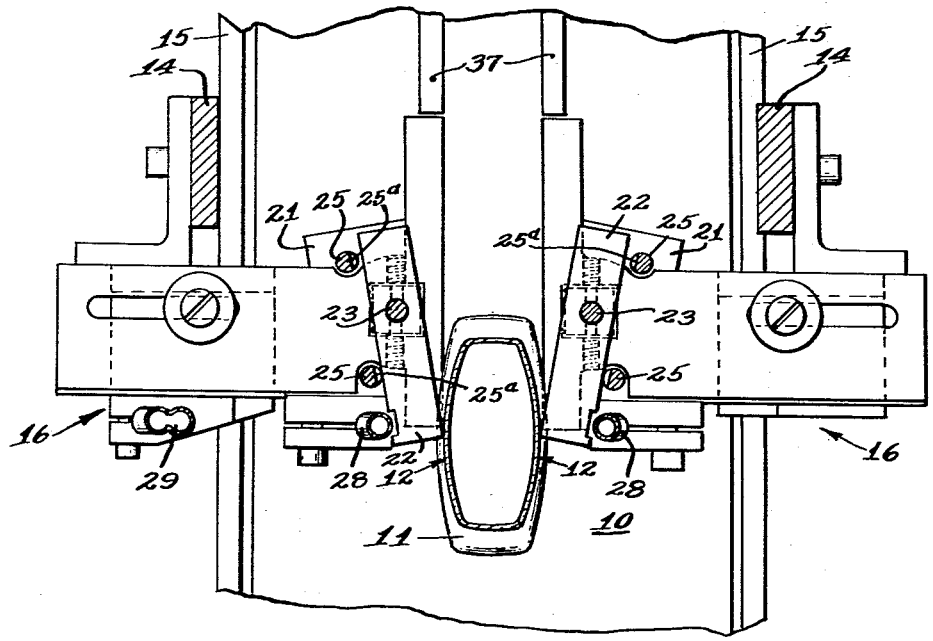
FIG. 4 is a sectional elevational view taken along the plane of line 4—4 of FIG. 2.

Our gauge 13 is positioned immediately above the conveyor 10, being supported upon a pair of opposed upright bars 14, which are secured to the conveyor carrying frame 15 and extend a substantial distance above said conveyor. A cross-bar 15a interconnects the upright bars 14 and in turn supports part of the gauging mechanism, as will be apparent presently. At an elevation slightly higher than the conveyor 10, a bracket 16 is mounted on each of said upright bars 14 to support a set of reference fingers 21 and feeler or gauging fingers 22, as will be brought out herein. Each of these brackets 16 is adjustable vertically on its supporting bar 14 as may be required by the height of the particular flasks being gauged. This is obtained by means of connectors 17 (FIG. 1) on the bracket received in vertical slots 18 in the upright bars 14. These brackets, also are angularly adjustable through the pivot or hinge pin 19 and the bolt and slot feature 20 (FIG. 2) which together permit slight tilting of the sets of fingers as may be required by the specific form or taper of the flask side walls. Some flasks are straight parallel-sided while in others the side walls taper upwardly and inwardly slightly. The bracket adjustment compensates for such variations. As shown, there are two sets, or vertical series, of reference fingers 21 and feeler or gauging fingers 22, there being one set at each side of the longitudinal center of the conveyor. These are carried indirectly by the previously mentioned adjustable brackets 16. Each set comprises a pair of upper and lower reference fingers 21 which contact the sides of the flask above and below the label space 12. These reference fingers 21 are elongated flat elements, each being mounted on a vertical pivot pin 23 or rod (FIGS. 1, 2 and 5) on which they are adjustable axially to suit the particular bottle height. A spring 24 is associated with each reference finger 21 (FIG. 5), functioning to yieldingly urge its finger into engagement with an advancing bottle. The spring tension is light enough to permit free flow of bottles or flasks through the gauging station or zone G. These reference fingers 21 function to properly orient pairs of gauge rods 25, which, as will become evident hereinafter, comprise a vital part of the electric circuitry involved.

The feeler or gauging fingers 22 are also mounted for horizontal rocking movement upon the aforementioned vertical pivot pin 23 or rod. These fingers 22, as will be evident function as electrical circuit closing switches in cooperation with pairs of gauge rods 25. There are two such gauge rods (FIGS. 5, 6 and 7) for each set or series of feeler fingers 22. Each gauge rod 25 has an elongated longitudinal flat surface 25a for contact with the feeler fingers 22. When the flat surfaces 25a are positioned as in FIGS. 5–7, only bottles having maximum bulges or sunken areas in the label panel 12 will close the electrical circuit and cause bottle ejection. By rotating the knobs 26 through which the rods 25 extend, the position of the flat surfaces 25a may be changed angularly and thereby regularly determine the degree of imperfection or defect in the label panel which must prevail to close the electrical circuit. Thus close control is possible.

These feeler or gauging fingers 22 may be yielding urged into contact with the flask surface by spring means (not shown) or by means of streams or jets of air under pressure emitted from apertures 27 in air supply tubes 28 to which air under suitable pressure is delivered by a conduit 29. Thus as a flask 11 moves forwardly between the angularly positioned sets of fingers, the feeler fingers 22 ride over the label accommodating surface or panel and if in either an excessively bulged or sunken area is encountered such fingers, or one of them, will move as suggested in FIG. 6 or 7, and through selected gauge rods 25, close the circuit and cause flask ejection.

Normally the electrical circuit (FIG. 9) involved is open, but with entry of a flask into the gauging station or zone G, the neck engages a microswitch actuating finger 30 or arm (FIGS. 1, 2 and 5) connected to a low force rotary micro switch 31 which is open normally and is suspended from the cross bar 15a of the main frame. Thus the circuit is closed, except for that portion involving the feeler fingers 22. Should one or more of the feeler fingers 22 engage a bulge or sunken area greater than a specified tolerance, whether on only one, or both, sides of the flask, the feeler fingers will engage and close the electrical circuit through at least one of the gauge rods 25. This momentarily grounds the normally negative grid of the tube 32 and energizes a relay 33 which in turn operates the reject solenoid air valve 34, such permitting flow of air under pressure through the nozzle 35 (FIG. 5) across the path of flasks advancing with the conveyor 10. A conventional adustable time delay potentiometer 36 functions to hold the solenoid valve 34 open a period of time to insure rejection of the defective flask. This potentiometer is readily adjusted to the lineal speed of the conveyor 10.

In view of the foregoing it is believed evident that as flasks 11 move upright to the gauging station G they are oriented by guides 37 so that they enter the gauge 13 with their opposed flat sides positioned for contact with the reference and feeler fingers 21 and 22 respectively. Should either side panel in that area between the reference fingers 21 be defective, as explained heretofore, one or more of the feeler fingers 22 will move on its pivot and through one of the gauge rods 25 close the circuit and produce the results explained in the preceding paragraph, it being understood that each cycle of gauging is initiated by the rotary microswitch being closed by means of the flask actuated lever 30 or arm.

Modifications may be resorted to within the spirt and scope of the appended claims.

We claim:

1. In a gauge for detecting an excessively bulged or sunken side surface of a flask or similar container, reference fingers for guiding an advancing upright flask along a prescribed horizontal path, a plurality of horizonally movable feeler fingers arranged in a vertical series at one side of said path and means for yieldingly urging the fingers into contact with the flask, the last named means being a generally vertical tube having a series of air pressure discharge apertures, said tube extending alongside the feeler fingers with the apertures facing the latter.

2. In a gauge for detecting excessively bulged or sunken side surfaces of a flask or similar panel type container, a pair of vertically spaced apart reference fingers at each side of a prescribed horizontal path of travel of the flask for orienting and guiding the flask in said path, means yieldingly urging the reference fingers into contact with areas of the flask above and below the said side surfaces, a plurality of feeler fingers between each said pair of reference fingers, means supporting the feeler fingers for horizontal movement toward and away from said side surfaces, and means for directing streams of air under pressure against the feeler fingers urging them into contact with said side surfaces of the flask.

3. In a gauge as defined in claim 2, the feeler fingers each being pivoted on a vertical rod and having a free end engageable with one of said side surfaces.

4. In a gauge as defined in claim 2, the last-named means being an air pressure supply tube extending generally vertically alongside the feeler fingers and having air outlet apertures facing the feeler fingers thereby to direct streams of air under pressure onto the feeler fingers, and means supplying air under pressure to said tubes.

5. In combination a horizontal conveyor for advancing generally flat-sided flasks or similar containers to and beyond a gauging station, a gauge at said station comprising a pair of superposed pivoted reference fingers at each side of the path of advance of the flasks for contact with areas of the latter above and below label accommodating surfaces which are to be gauged, said reference fingers being positioned angularly to guide flasks to a gauging position, a plurality of vertically spaced-apart pivoted feeler fingers between each pair of superposed reference fingers, means utilizing streams of air under pressure for urging the feeler fingers into contact with the label accommodating surfaces, flask ejecting means beyond the gauging station, and means actuated by excessive movement of any of the feeler fingers on its pivot for effecting operation of the ejecting means.

6. In a combination as defined in claim 5, the flask ejecting means being an air pressure tube having a nozzle capable of directing a stream of air across the path of flasks moving away from said station.

7. A combination as defined in claim 6, and means for regulably controlling the duration of flow of air under pressure from said tube.

8. A combination as defined in claim 6 and electric circuitry including a solenoid valve actuated by a predetermined degree of movement of a feeler finger riding over the labeling surface for controlling the flow of air under pressure to said tube.

9. In a combination as defined in claim 5, the last-named means including a time delay relay, a solenoid valve in series with said relay for regulably controlling flow of air under pressure and the ejecting means being an air tube or nozzle receiving air under pressure by way of said valve and directing it across the path of flasks moving away from said station.

10. In a gauge for detecting bulged and sunken side panels of bottles advancing upright along a prescribed path with the panels facing opposed sides of the path, a vertical series of pivoted horizontally swingable current conductive feeler fingers at each side of the path, means yieldingly urging one end of each of the fingers into contact with the panels of a bottle moving along said path, a pair of vertical rods at each side of and spaced apart along said path and comprising elements of electric circuitry, each said rod positioned near and for contact one at a time with an end of said fingers, and means operable in response to engagement of a finger with either of the adjacent pair of rods for ejecting a bottle from said path.

11. In a gauge as defined in claim 10, the last named means being an air nozzle for directing a stream of air under pressure across said path, and a solenoid valve for regulably controlling flow of air under pressure to the nozzle.

12. In a gauge as defined in claim 10, the last named means being an air nozzle for directing a stream of air under pressure across said path, a solenoid valve for regulably controlling the flow of air under pressure to the nozzle, and time delay means for predetermining the period of time the solenoid valve is open.

13. In a gauge for detecting bulged and sunken side panels of bottles advancing upright along a prescribed horizontal path with the panels facing opposed sides of the path, a vertical series of electric current conductive feeler fingers at each side of said path, each finger pivoted for rocking movement about a generally vertical axis medially its length, means yieldingly urging an end of each finger into contact with a panel of a bottle moving along said path, electric circuitry closable by excessive movement of said an end of a finger horizontally relative to the bottle axis, an air nozzle for directing a stream of air under pressure across said path to eject defective bottles, and a solenoid valve actuated by closing of the circuitry for regulably controlling flow of air under pressure to the nozzle.

References Cited
UNITED STATES PATENTS

| | | | |
|---|---|---|---|
| 2,419,280 | 4/1947 | Neff | 33—143 |
| 3,032,192 | 5/1962 | Uhlig | 209—88 |
| 3,080,659 | 3/1963 | Wolford | 209—88 X |
| 3,270,881 | 9/1966 | Calhoun | 209—74 |

M. HENSON WOOD, JR., *Primary Examiner.*

R. A. SCHACHER, *Assistant Examiner.*